United States Patent [19]

Sarcia

[11] 3,825,727

[45] July 23, 1974

[54] EMBOSSED CARD READER AND IMPRINTER

[75] Inventor: Domenico S. Sarcia, Winchester, Mass.

[73] Assignee: Amron Research and Development Corporation, Longmeadow, Mass.

[22] Filed: Aug. 22, 1972

[21] Appl. No.: 282,715

[52] U.S. Cl. ............. 235/61.11 R, 101/47, 197/6.1, 235/61.11 A, 271/51

[51] Int. Cl. ... G06k 13/07, B41l 45/12, B65h 5/06, G06k 1/12

[58] Field of Search ........... 340/146.3 A, 146.3 AE, 340/149 A; 197/6.1; 101/47; 235/61.11 A, 61.11 R; 271/51, 15, 45

[56] References Cited

UNITED STATES PATENTS

| | | | |
|---|---|---|---|
| 3,048,097 | 8/1962 | Miller | 101/47 |
| 3,353,007 | 11/1967 | Combs | 235/61.11 R |
| 3,448,249 | 6/1969 | Jones | 235/61.11 A |
| 3,457,392 | 7/1969 | Dick | 235/61.11 R |
| 3,588,452 | 6/1971 | Kee | 235/61.11 E |
| 3,596,062 | 7/1971 | Street | 235/61.11 E |
| 3,627,994 | 12/1971 | Sallach | 340/149 A |
| 3,633,902 | 1/1972 | Worden | 271/51 |
| 3,637,202 | 1/1972 | Mowry | 271/51 |
| 3,671,717 | 6/1972 | Bieser | 340/146.3 AE |
| 3,714,398 | 1/1973 | Brock | 235/61.11 E |

*Primary Examiner*—Daryl W. Cook
*Assistant Examiner*—Robert M. Kilgore
*Attorney, Agent, or Firm*—Richard J. Birch

[57] ABSTRACT

An embossed card reader and sales draft imprinter which employs a spring clutch drive assembly for driving an embossed card through a card reading station and an imprinting station. A guide plate assembly is provided for initially positioning the embossed card with respect to the card reading station. Spring-loaded embossment followers responsive to the presence or absence of an embossment are located at the card reading station. These followers are used to modify the amount of light impinging upon a plurality of photodetectors in accordance with the presence or absence of the embossment. The output signals from the photodetectors are decoded to provide a reading of the alphanumeric embossments on the card. After passing through the card reading station, the embossed card is brought into physical contact with a carboned sales draft to imprint thereon the embossed information on the card.

17 Claims, 9 Drawing Figures

EMBOSSED CARD READER AND IMPRINTER

CROSS REFERENCE TO RELATED APPLICATION

This application is related to the application of W. Thompson Lawrence and David B. Spaulding for Embossed Care Reader filed concurrently herewith and assigned to the assignee of the present application.

The present invention relates to card readers in general, and more particularly to an embossed card reader and imprinter.

The ubiquitous embossed plastic credit card has a number of advantages for the credit card user and the store owner. It is a convenient means for obtaining credit and when used with an imprinter, provides a relatively permanent record of a portion of the necessary transactional information. Unfortunately, it also has a number of concomitant disadvantages namely in the area of security and fraud protection. In the last couple of years, the credit card industry has been plagued with the problems of unauthorized credit card use and bad accounts.

A variety of systems have been proposed to solve these problems. Identification of the credit card owner is now performed on a relatively limited basis through photographic, holographic and fingerprint techniques, while credit verification is obtained through telephone inquiries or "stand alone" local memories e.g. printed bad account lists, electronic and/or optically coded memories, etc. A number of systems have been proposed and hardware developed for "on-line" computer credit verification utilizing special point-of sale terminals and/or special credit cards. Although these systems are feasible, they are cost prohibitive at the present time.

One of the constraining parameters for any such system is the requirement that the system be compatible with the literally millions of existing embossed credit cards. It is accordingly a general object of the present invention to provide a credit card reader for existing embossed credit cards.

It is a specific object of the present invention to provide an embossed card reader and imprinter.

It is still another object of the present invention to provide an embossed card reader and imprinter which can be manually actuated by a sales clerk or by an "on line" computer.

It is a feature of the invention that the credit card is accurately positioned and held within a guide plate assembly even though it may have been inserted in the reader in a tilted or misaligned position.

It is another object of the invention to provide an embossed character reading head which accurately maintains the alignment and spacing of a plurality of embossment sensors.

It is another feature of the invention that the embossment reading system is relatively immune to deleterious environmental conditions.

It is still another object of the invention to provide an embossed card reader and sales draft imprinter which is relatively inexpensive and which utilizes readily available materials and components.

It is still another feature of the invention that the imprinter position thereof can be used by itself or in conjunction with the embossment reader.

These objects and features and other objects of the invention will be best understood from a detailed description of a preferred embodiment thereof selected for purposes of illustration and shown in the accompamying drawings, in which.

Figure 1:
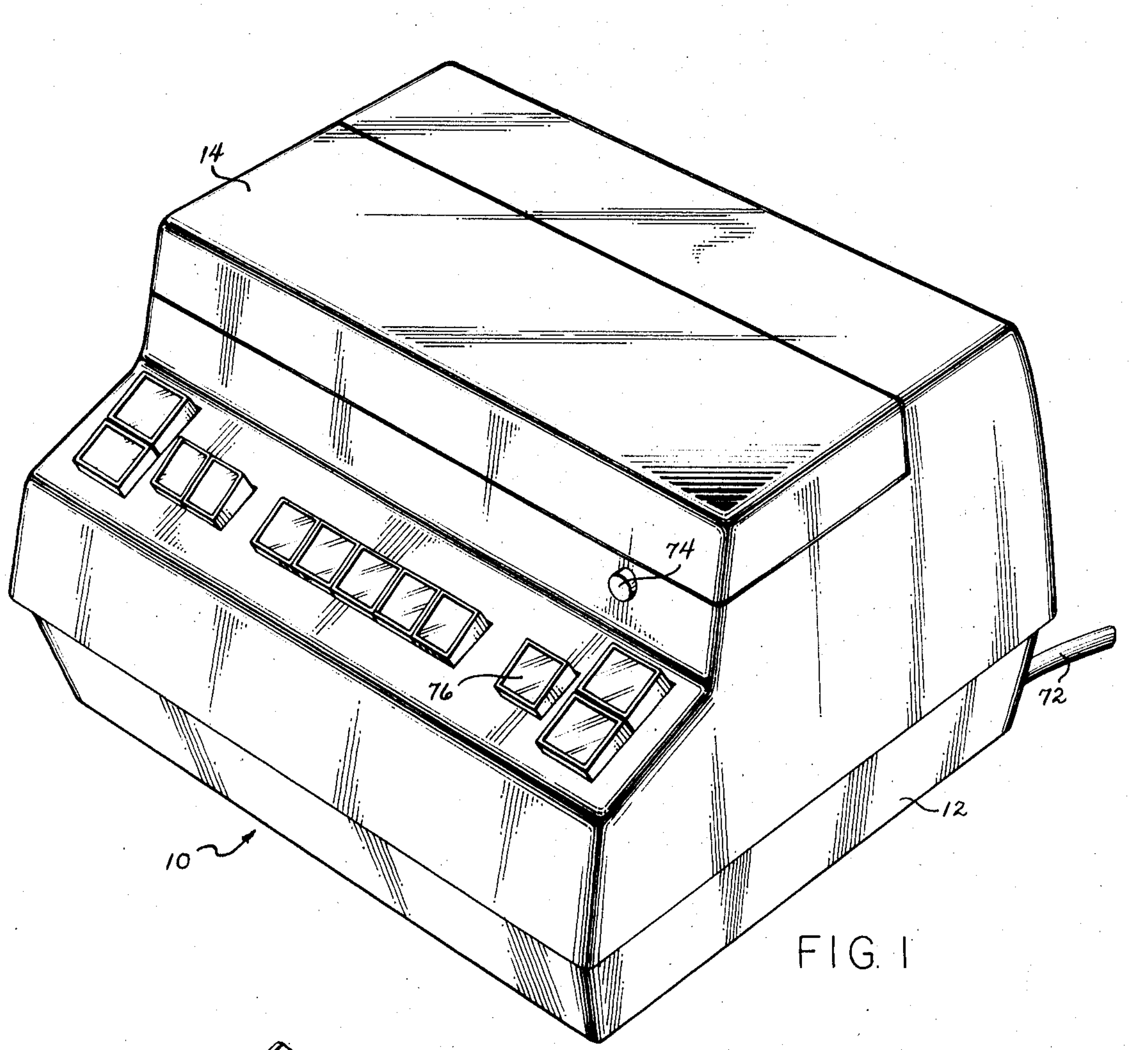
FIG. 1 is a view in perspective of an embossed card reader and imprinter constructed in accordance with the present invention.

Turning now to the drawings, there is shown an embossed card reader and imprinter constructed in accordance with the present invention and indicated generally by the reference numeral 10. The major components of the card reader and imprinter 10 are housed within a housing 12 having a hinged cover plate 14. When the cover plate 14 is opened, as shown in FIG. 3, access is provided for insertion of a sales draft 16 and an embossed card 16.

Figure 2:
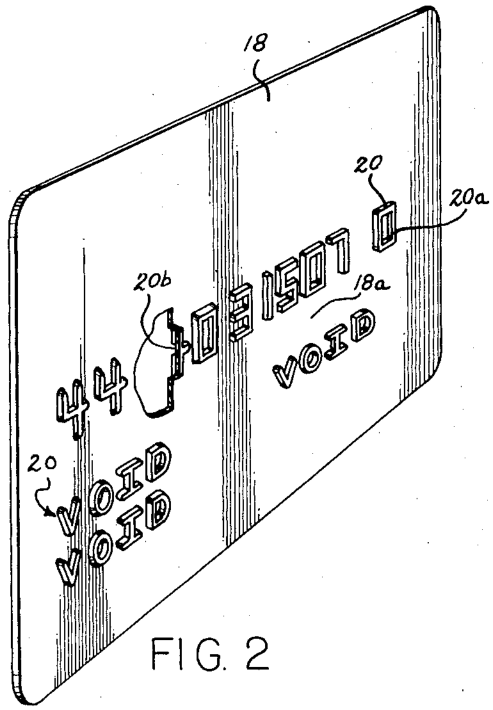
FIG. 2 is a view in perspective of a conventional embossed credit card with a section thereof broken away to illustrate the "negative" or concave portion of the embossments.

The embossed card 18 is shown in greater detail in FIG. 2. The card is a plastic credit card having alphanumerical embossments 20 formed in the card. The embossments 20 are shown in the standard credit card format with at least two spaced lines of embossments which are separated by an unembossed area 18*a*. The spacing between the two embossment lines meets the standards set forth by the credit card industry. Each embossment on the card has a "positive" or convex side 20*a* and a "negative" or concave side 20*b*. In the preferred embodiment of the present invention, the "negative" or concave side of the embossment is sensed by the card reader and converted into electrical signals which represent the presence or absence of the embossment. The operation of the embossment reader will be discussed below in detail. However, for the moment it is sufficient to note that the embossed card reader and imprinter 10 generates appropriate electrical signals which can be decoded to provide the desired alphanumeric embossment information for local or remote processing.

Figure 3:
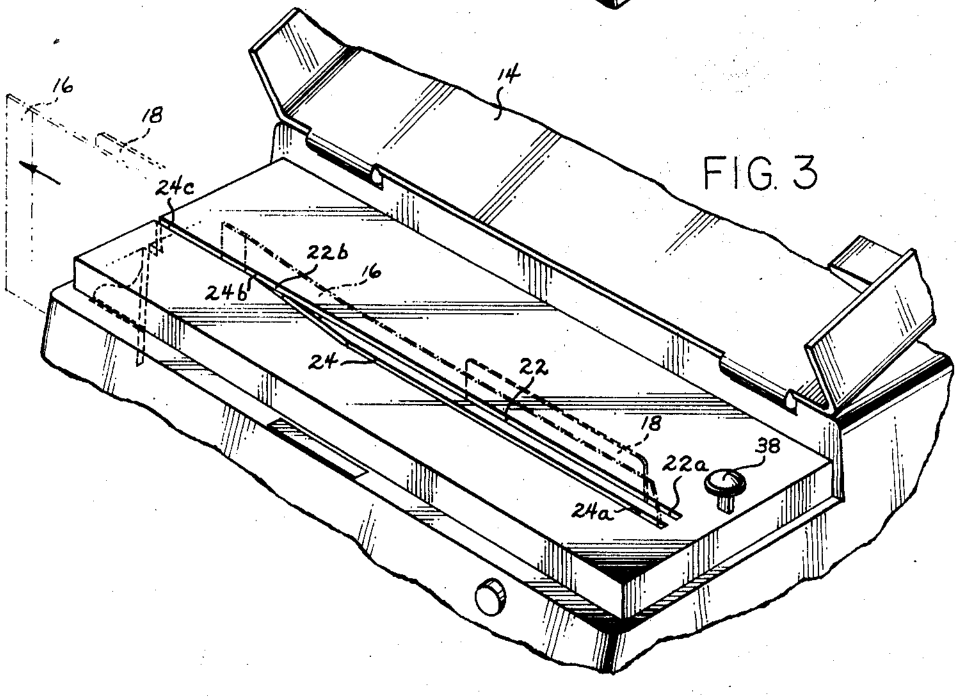
FIG. 3 is a view in perspective of a portion of the embossed card reader and imprinter shown in FIG. 1 with the cover thereof depicted in the open position.

Referring to FIG. 3, the embossed card 18 is inserted by the sales clerk into an embossed card guid path 22 having an entry portion 22*a* and an exit portion 22*b*. A similar guide path 24 is provided for the sales draft 16. The sales draft guide path 24 has an entry portion 24*a*, an imprinter portion 24*b*, and an exit portion 24*c*. It can be seen in FIG. 3 that the exit portion of the card guide path 22 exits into the sales draft guide path just before the imprinter portion 24*b*. This configuration permits the card and sales draft to go through the imprinter portion together so that the embossments will "imprint" on the sales draft. The sales draft 16 comprises a standard pressure sensitive sales draft such as the conventional shingled carbon sales draft or a "no carbon required" sales draft.

Figures 4, 6, 7:
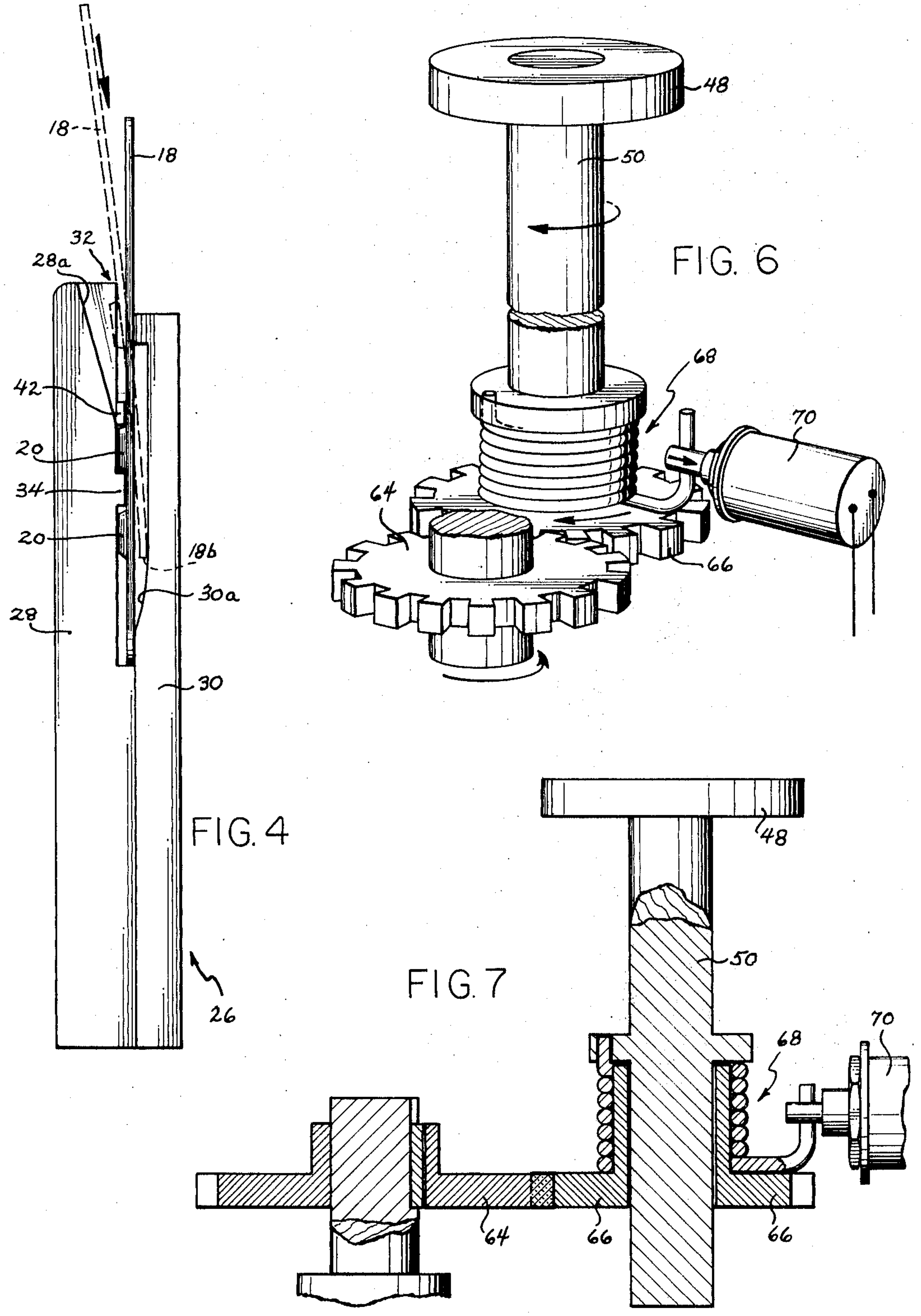
FIG. 4 is an end view of an embossed card guide plate assembly showing the embossed card partially and fully inserted therein.
FIG. 6 is a view in perspective showing in greater detail the solenoid actuated, spring-clutched drive wheels illustrated in FIG. 5.
FIG. 7 is a side elevation in partial section of the solenoid actuated, spring-clutched drive wheel assembly.
Figure 5:
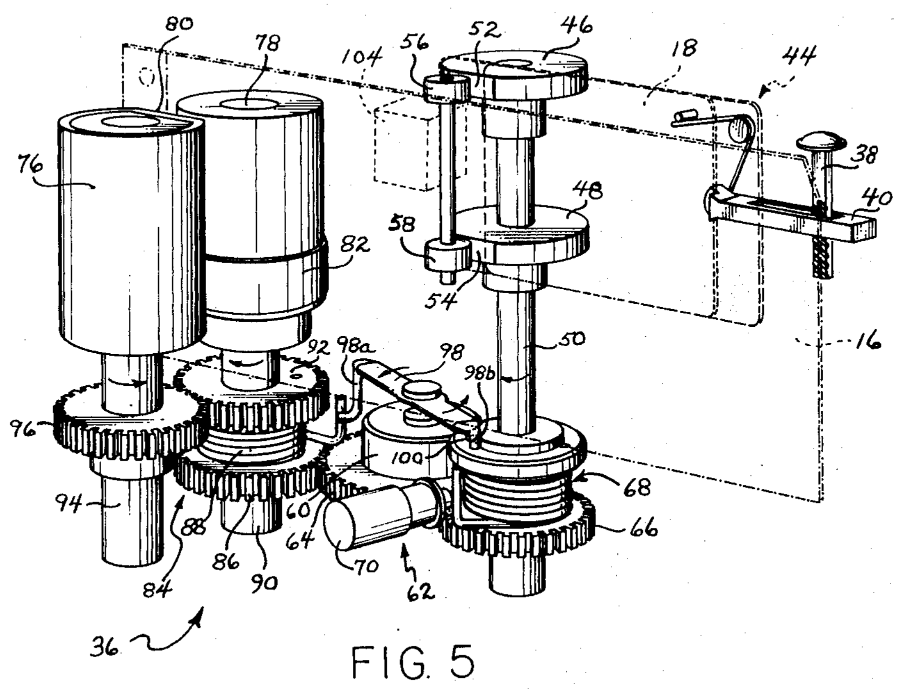
FIG. 5 is a view in perspective of the drive train assembly for the embossed card and sales draft with the supporting structure removed for purposes of clarity.

The relative positioning of the sales draft 16 and embossed card 18 in the loading position can best be seen by referring to FIGS. 4 and 5. FIG. 4 depicts a guide plate assembly 26 which accurately positions the embossed card 18 for subsequent processing in the card reader and imprinter. The guide plate assembly 26 comprises a card guide plate 28 and a back-up plate 30 which together define a card-receiving aperture 32. The upper inner surface 28*a* of the card guide plate, as viewed in FIG. 4, is beveled to provide an easy access into the card receiving aperture 32. In a similar manner, the inner surface 30*a* of the back-up plate is cut away in a gradual concave form to provide a guiding surface for the card 18 during insertion.

Looking at FIG. 4, it can be seen that as the card 18 is partially inserted into the guide plate assembly (as shown by the dash lines in FIG. 4), the leading edge 18*b* extends beyond a guide plate horizontal projection rail 34, and then is directed downwardly and inwardly by the concave curved surface 30*a*. The card continues downwardly until it occupies the position shown by the solid lines in FIG. 4. In this position, the card is locked within the card-receiving aperture by the two lines of card embossments 20 which straddle the guide plate projection rail 34. A sloping edge, horizontaly extending guide rail 42 is used to accurately position the embossments between rail 34 and lower edge of rail 42.

Referring now to FIG. 5, there is shown a drive train assembly, indicated generally by the reference numeral 36, for driving the embossed card 18 through its guide path 22 and into the sales draft guide path and then driving both the sales draft 16 and the card 18 through the sales draft guide path 24. The associated supporting structures, including the embossed card guide plate assembly 26, have been omitted from FIG. 5 for purposes of clarity. The operation of the drive train assembly can best be understood by viewing FIG. 5 in conjunction with FIGS. 1 and 3. Assuming that the embossed card 18 has been inserted in the entry portion 22*a* of the card guide path and the card extends downwardly into the locked position within the card-receiving aperture 32 of the guide plate assembly, the hinged cover 14 is moved to the closed position shown in FIG. 1. As the cover 14 closes, it engages a geared card positioning lever 38 and forces the lever downwardly as viewed in FIG. 5. The downward motion of the geared lever 38 causes geared arm 40 to move horizontally to the left as viewed in FIG. 5. The arm 40 pushes the embossed credit card 18 beyond center line of drive wheels 46, and 48 (shown in FIG. 5). A spring-loading system, indicated generally by the reference numeral 44, returns the arm 40 and positioning lever 38 to the card loading position when the hinged cover is again opened.

It will be appreciated that given the vertical and horizontal alignment provided by the locking combination of the card guide plate projection rail 34 and guide rail 42 with the card embossments 20 the credit card 18 has been accurately positioned for subsequent travel through the card and sales draft guide paths.

The drive system for the embossed card 18 is shown in FIGS. 5, 6, and 7 and comprises two drive wheels 46 and 48 which are mounted on a common shaft 50. The drive wheels 48 and 50 each have a flat or chord portion 52 and 54, respectively. The drive wheel chord portions 52 and 54 are located within a common plane on one side of the embossed card guide path 22 (see FIG. 1). A pair of back-up wheels 56 and 58 is positioned opposite the drive wheels on the other side of the embossed card guide path 22. Looking specifically at FIG. 5, it can be seen that the space between the back-up roll 56 and the chord portion 52 of the upper wheel and the corresponding space between the backup wheel 58 and the lower wheel chord portion 54 allows the embossed card 18 to be inserted downwardly into the guide path and the guide plate assembly. However, when the guide wheel 46 and 48 are rotated in the direction of the arrow, a sufficiently tight nip is formed by the circular portion of the wheels to drive the card through the nip and into the sales draft guide path.

Driving power for the card drive wheels 46 and 48 is obtained from an electrically actuated motor 60 through a drive train 62 comprising the motor gear 64 and drive shaft gear 66. A spring clutch 68 is used to engage and disengage the drive train from the drive shaft 50. The spring clutch is controlled by means of an electrically actuated solenoid 70. Electrical power for the drive motor 60 and solenoid 70 is obtained from a conventional power source (not shown) through power cables 72 (see FIG. 1).

The spring clutch arrangement for the drive wheels 46 and 48 permits the motor 60 to run at a constant speed whenever the card reader and imprinter is turned on by means of a lighted main power switch 74 (see FIG. 1). The solenoid 70 can be actuated by the sales clerk by means of an imprint switch 76 or by a remote computer if the card reader and imprinter is in an "on line" mode. Appropriate signal cables are provided in the main power cable bundle 72 for connection with the central computer.

Actuation of the solenoid 70 allows the spring clutch 68 to make one revolution. Since the clutch is engaged during this period, the drive shaft 50 and card drive wheels 46 and 48 will also make one revolution. The circumferential length of the two drive wheels is selected to drive the embossed card in one revolution from the card guide path entry portion to the imprinter portion of the sales draft guides (FIG. 1).

Although two separate drive wheels have been depicted in FIG. 5 for the embossed card, it will be appreciated that a single drive roll of the same diameter and having an axial length equal to the axial length of the drive wheels 46 and 48 and the distance between the drive wheels could be used to drive the embossed card. The drive roll configuration is used to drive the sales draft and embossed card through the imprinter and exit portions of the sales draft guide path.

A sales draft drive roll 76 is positioned on one side of the sales draft guide path at the imprinter position thereof. A driven back-up roll 78 is positioned opposite the drive roll 76 on the other side of the sales draft guide path. The drive roll 76 has a flat or chord portion 80 which forms a space between the two rolls for the sales draft 16. When the two rolls are rotated in the direction of the arrows shown in FIG. 5, a sufficiently tight nip is formed between the rolls to drive the sales draft and embossed card through the nip. As the sales draft and embossed card pass through the nip, the embossments are imprinted upon the sales draft. A separate, embossed "store plate" 82 is normally affixed to the back-up roll 78 to imprint the appropriate "store" information on each sales draft.

Driving power for rolls 76 and 78 is obtained from the previously mentioned motor 60 through a drive train indicated generally by the reference numeral 84. The drive train comprises the motor gear 64 and drive shaft gear 86. A spring clutch 88 is employed to engage and disengage the drive train from back-up roll drive shaft 90, drive shaft gear 92 and drive roll drive shaft 94 and gear 96.

Sequential operation of the embossed card spring clutch 68 and the sales draft spring-clutch 88 is provided by means of a trip lever 98. One end 98*a* of the trip lever holds the sales draft spring clutch in the disengaged position. The other end 98*b* of the trip lever is moved by a projection 100 which rotates with ring member 102 as the drive shaft 50 makes its single revolution. At the end of the revolution, the projection forces the trip lever end 98*b* toward the sales draft as viewed in FIG. 5. The trip lever rotates sufficiently to move the other end 98*a* out of disengaging contact with the sales draft spring-clutch 88. The spring-clutch 88 then engages the sales draft drive train 84, causing drive roll 76 and back-up roll 78 to rotate in the direction shown by the arrows in FIG. 5. The two rolls each make one revolution and then stop. The circumferential length of the rolls 76 and 78 is selected to provide sufficient movement to drive the sales draft and embossed card through the imprinter portion and out of the exit portion of the sales draft guide path.

Figure 9:
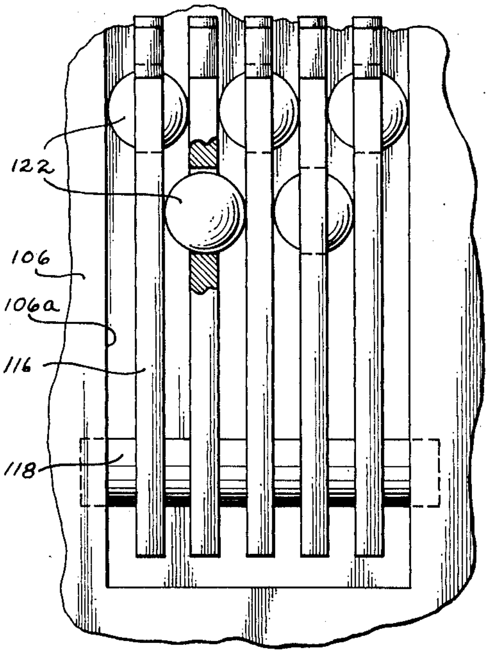

Having described in detail the imprinter portion of the embossed card reader and imprinter, I will now describe the embossed card reader portion of the present invention. Looking at FIGS. 8 and 9, there is shown an embossment reader or sensor indicated generally by the reference numeral 104. The reader 104 comprises a support member 106 upon which are mounted a plurality of embossment sensors indicated generally by the reference numeral 108, a plurality of photodetectors 110, a light source 112, and a plurality of light directing fiber-optic pipes 114. The embossment sensors 108 modify the amount of light impinging upon the photodetectors 110 in response to the presence and absence of an embossment on the embossed card 18.

In the preferred embodiment, the sensors 108 detect the "negative" going or concave portion 20b of the embossments and in response thereto allow the light from light source 112 to impinge upon the photodetectors 110. Conversely, when the sensors detect the umembossed, flat portion of the embossed card 18, they prevent the light from light source 112 from impinging upon the photodetectors. It will be appreciated that the opposite light logic can be employed and that the reader 104 can be instrumented to respond to the "positive" going or convex portion of the card embossments 20.

Figure 8:
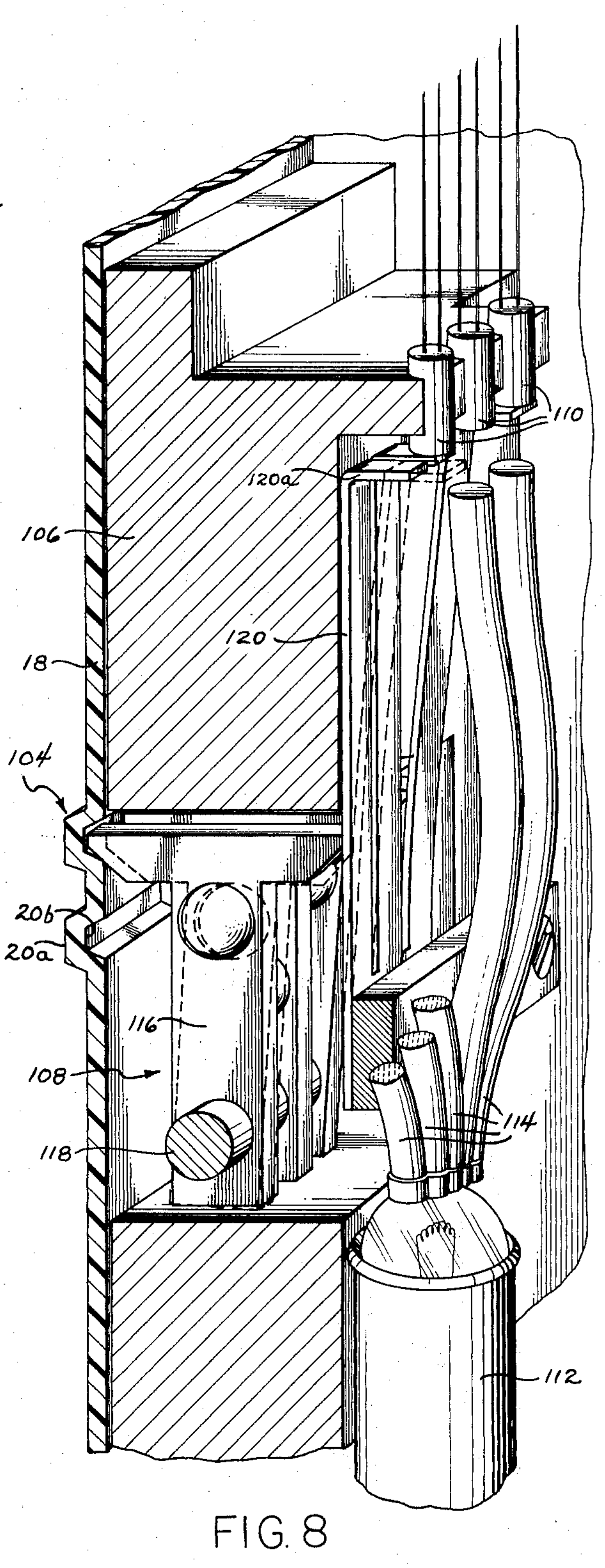
FIG. 8 is a perspective view in partial section of the embossment reading head; and, FIG. 9 is an enlarged plan view of the reading head "fingers" or sensors shown in FIG. 8.

The mechanical details of the embossment sensors 108 can best be understood by referring to FIG. 8. Each sensor 108 comprises pivotally mounted T-shaped spring-loaded embossment follower 116. Each follower is pivotally mounted on a shaft 118 and spring-loaded by means of a corresponding spring 120. Each spring 120 has a distal end portion 120*a* which is positioned to make or break the light beam between the photodetectors 110 and the fiber-optic light pipes 114. FIG. 8 illustrates the two positions for the spring-loaded T-shaped followers 116 and the distal end portions 120*a* of the associated springs. The solid lines in FIG. 8 depict the T-shaped spring-loaded follower 116 in contact with the "negative" or concave portion of an embossment 20*b*. In this position, spring 120 is flat against the support 106 thereby allowing light from light source 112 to impinge upon the photodetector 110. When the T-shaped embossment follower contacts the flat, unembossed portion of the card 18, it is moved against the spring 120. The movement of the spring-loaded follower 116 forces the corresponding spring 120 to bend thereby causing the distal end thereof 20*a* to interrupt the light impinging upon the associated photodetector 110. The light beam interrupting position of the T-shaped follower and spring is shown by the dashed lines in FIG. 8.

The outputs from photodetector 110 represent in electrical form the presence or absence of an embossment on the embossed card 18. A suitable logic circuit (not shown) is connected to the photodetectors 110 to decode the outputs thereof to provide a reading of the alphanumeric embossments on the card 18. Such circuits are known to the art and, therefore, need not be described in any detail. In the "on line" mode, the electrical outputs from the photodetectors 110 or the decoded versions thereof are transmitted to a remote location, such as, a central computer, for further utilization.

It will be appreciated that the spacing between each of the embossment sensors must be maintained within relatively tight tolerances in order to provide the desired sensing resolution for the component portions of each embossment on the card 18. In the preferred embodiment of the invention, the spacing between the T-shaped spring-loaded embossment followers 116 is maintained by means of spherical members 122 which are rotatably mounted within the T-shaped followers and extend outwardly therefrom. As viewed in FIG. 9, it can be seen that the diameter of each of the spherical members 122 is substantially equal to the distance between the T-shaped members located on each side of the T-shaped member in which the spherical member is rotatably mounted. The outer two spherical members contact the sides 116*a* of support member 116 in order to maintain the spacing of the corresponding outer two T-shaped followers.

Having described in detail the preferred embodiment of my invention, it will be understood that numerous modifications can be made therein without departing from the scope of the invention as defined in the appended claims. For example, the imprinting portion of the invention can be used alone or in conjunction with the card reading portion. Conversely, the embossment reader can be used by itself or together with the imprinter portion. Similarly, the embossed card guide assembly can be used independently of the imprinter and card reader in other embossed card processing systems.

What I claim and desire to secure by letters Patent of the United States is:

1. An embossed card-pressure sensitive sales draft imprinter and card reader comprising:

1. means defining a guide path for a pressure sensitive sales draft, said sales draft guide path having an entry portion, an imprinter portion and an exit portion;

2. means defining a guide path for an embossed card, said embossed card guide path having an entry portion and an exit portion with said exit portion exiting into said sales draft guide path;

3. drive means for driving an embossed card through said embossed card guide path and into said sales draft guide path;

4. drive means for driving a pressure sensitive sales draft and an embossed card through said imprinting portion and out of the exit portion of said sales draft guide path;

5. means for sequentially actuating said embossed card drive means and then said sales draft and embossed card drive means;

6. a light source;

7. a plurality of light responsive means positioned to receive light from said light source, said light responsive means producing a signal having a characteristic which represents the amount of light impinging thereon; and, 8. a plurality of adjacent, spaced, spring-loaded movable means responsive to the presence and absence of an embossment on said embossed card for correspondingly modifying the amount of light from said light source which impinges upon said light responsive means.

2. An embossed card-pressure sensitive sales draft imprinter comprising:

1. means defining a guide path for a pressure sensitive sales draft, said sales draft guide path having an entry portion, an imprinter portion and an exit portion;

2. means defining a guide path for an embossed card, said embossed card guide path having an entry portion and an exit portion with said exit portion exiting into said sales draft guide path;

3. drive means for driving an embossed card through said embossed card guide path and into said sales draft guide path;

4. drive means for driving a pressure sensitive sales draft and an embossed card through said imprinting portion and out of the exit portion of said sales draft guide path; and, 5. means for sequentially actuating said embossed card drive means and then said sales draft and embossed card drive means.

3. The apparatus of claim 2 wherein said drive means for said embossed card comprises:

1. drive roll means rotatably mounted on one side of said card guide path;

2. back-up roll means for said drive roll means rotatably mounted on the other side of said card guide path;

3. electrically activated motor means; and 4. drive train means for mechanically coupling said motor means to said drive roll means.

4. The apparatus of claim 3 wherein said drive train means includes spring clutch means for engaging and disengaging said drive train means from said drive roll means.

5. The apparatus of claim 3 wherein said drive roll means has a flat, chord portion.

6. The apparatus of claim 4 wherein said means for driving said pressure sensitive sales draft and said embossed card through said guide path imprinting portion comprises:

1. drive roll means rotatably mounted on one side of said sales draft guide path;

2. back-up roll means for said drive roll means rotatably mounted on the other side of said sales draft guide path; and, 3. drive train means for mechanically coupling said motor means to said sales draft and card drive roll means.

7. The apparatus of claim 6 wherein said drive train means includes spring clutch means for engaging and disengaging said drive train means from said sales draft and card drive roll means.

8. The apparatus of claim 7 wherein said drive roll means for said card and said drive roll means for said sales draft and card each have a flat, chord portion.

9. The apparatus of claim 8 further comprising means for first engaging the spring clutch for said card drive roll means and thereafter engaging the spring clutch for said sales draft and card drive roll means.

10. The apparatus of claim 2 wherein said drive means for said embossed card comprises:

1. first and second drive wheel means positioned in spaced relation and rotatably mounted along a common axis on one side of said card guide path;

2. corresponding first and second back-up wheel means for said first and second drive wheel means, said back-up wheel means being positioned in spaced relation and rotatably mounted along a common axis on the other side of said card guide path;

3. electrically actuated motor means; and, 4. drive train means for mechanically coupling said motor means to said first and second drive wheel means.

11. The apparatus of claim 10 wherein said drive train means includes spring clutch means for engaging and disengaging said drive train means from said first and second drive wheel means.

12. The apparatus of claim 11 wherein said first and second drive wheels means are mounted on a common shaft with the shaft and drive wheel means being rotatably mounted for rotation as a unit and each of said drive wheel means having a flat, chord portion with said flat chord portions being in a common plane.

13. The apparatus of claim 12 wherein said means for driving said pressure sensitive sales draft and said embossed card through said guide path imprinting portion comprises:

1. drive roll means rotatably mounted on one side of said sales draft guide path;

2. back-up roll means for said drive roll means rotatably mounted on the other side of said sales draft guide path;

3. drive train means for mechanically coupling said motor means to said sales draft and card drive roll means.

14. The apparatus of claim 13 wherein said drive train means includes spring clutch means for engaging and disengaging said drive train means from said sales draft and card drive roll means.

15. The apparatus of claim 14 wherein said drive roll means has a flat, chord portion.

16. The apparatus of claim 15 portion comprising means for first engaging the spring clutch means for said first and second drive wheel means and then engaging the spring clutch means for said drive roll means.

17. The apparatus of claim 16 wherein said first and second drive wheel means spring clutch is disengaged before said drive roll spring clutch is engaged.

* * * * *